June 17, 1930.  H. J. WOOCK  1,764,378
TIRE RETREADING MOLD
Filed Nov. 6, 1928  3 Sheets-Sheet 1

INVENTOR
H.J. Woock
BY
ATTORNEY

June 17, 1930. H. J. WOOCK 1,764,378
TIRE RETREADING MOLD
Filed Nov. 6, 1928 3 Sheets-Sheet 2
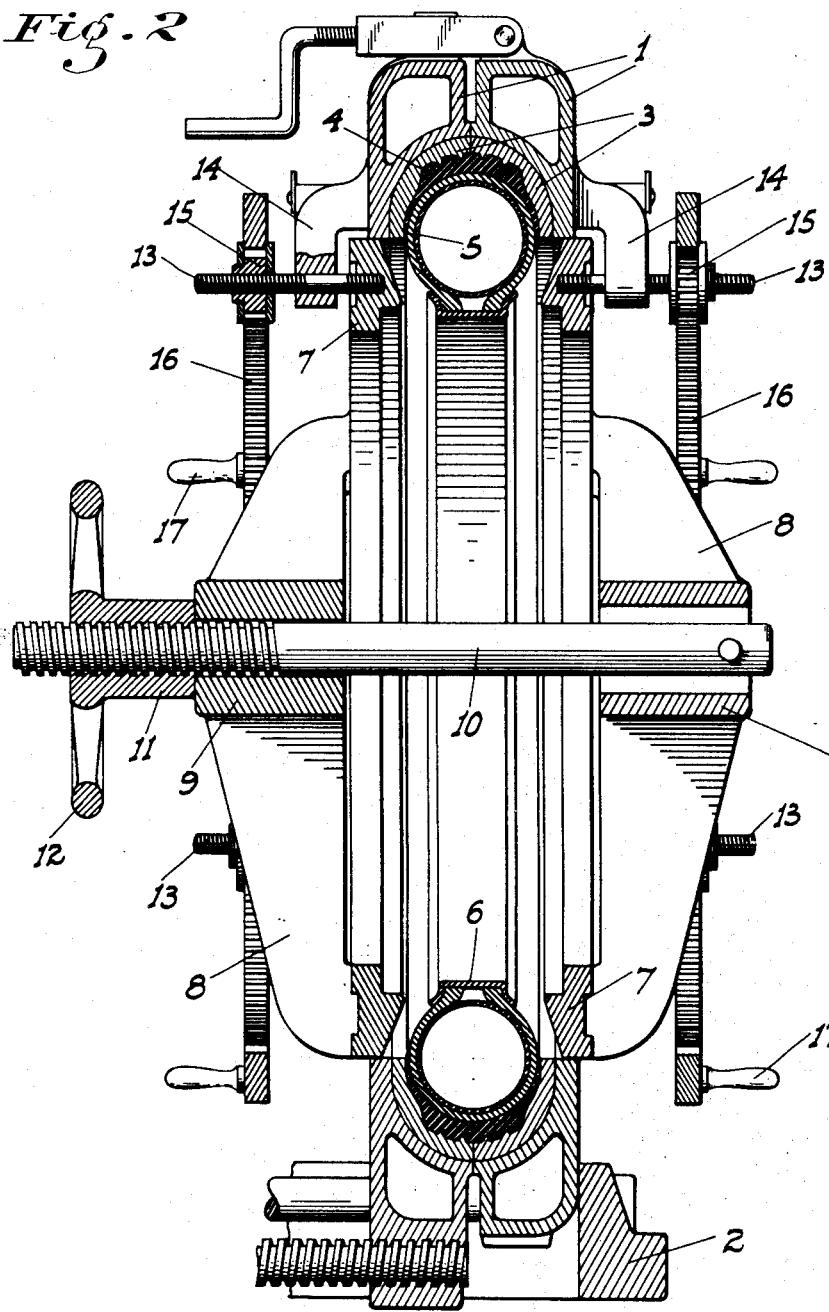
INVENTOR
H. J. Woock
BY
ATTORNEY

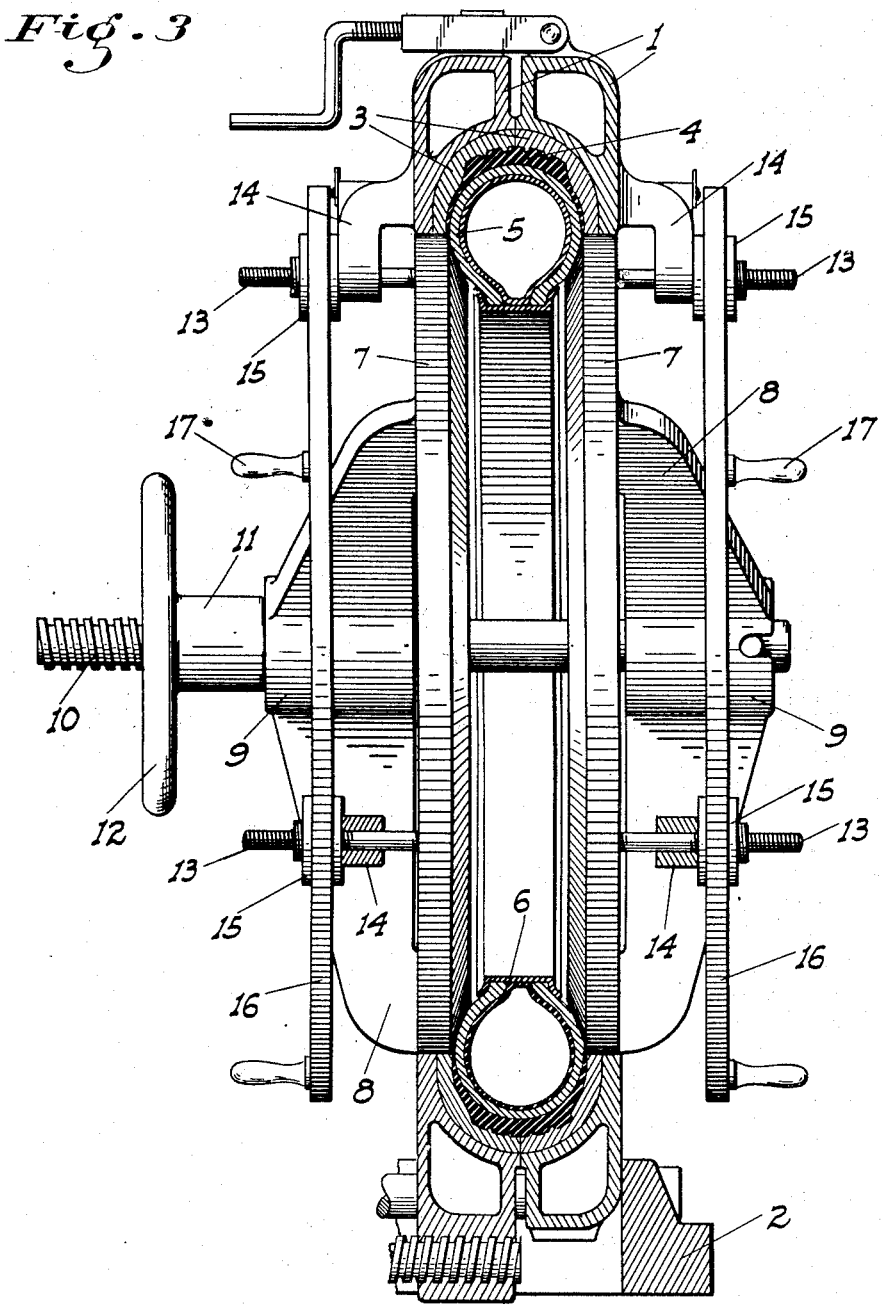

Patented June 17, 1930

1,764,378

UNITED STATES PATENT OFFICE

HERBERT J. WOOCK, OF LODI, CALIFORNIA, ASSIGNOR, BY MESNE ASSIGNMENTS, TO SUPER MOULD CORPORATION, OF RENO NEVADA, A CORPORATION OF NEVADA

TIRE-RETREADING MOLD

Application filed November 6, 1928. Serial No. 317,515.

This invention relates to molds for retreading automobile tires, of that general continuous-circle character shown in Patent No. 1,662,035 granted March 6, 1928, to Messrs. Smith, Caufield and Peterson; and in which annular rings were mounted for axial movement relative to the mold against the opposite sides of the tire to cause the tread portion thereof to be firmly engaged with the matrix portion of the mold. The present invention relates particularly to the means for controlling the movement of these rings.

In the structure of the previous patent, as well as in that of the later patent of the same parties, No. 1,710,804 dated April 30, 1929, the rings were moved inwardly against the tire by a number of independently actuated elements, and there was nothing to definitely limit the movement of the rings toward each other. I have found from experience and experiment however that such movement for any tire of a given cross sectional diameter must be a certain amount, no more and no less. This is because an excessive movement of the rings counteracts to a certain extent the benefits obtained by the use of such rings by pulling the side edges of the tire away from the matrix; while an insufficient movement of the rings does not completely expand the tread against the matrix as is desirable.

I also found that with tires of different cross sectional diameters such as can be handled in the one mold by changing the matrices, the rings must be moved toward each other different distances for such different tires.

The principal aim of the present invention therefore is to provide means for positively limiting the inward movement of the rings toward each other and for enabling the extent of such movement to be easily and accurately adjusted to the needs of different sized tires.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 2 is a vertical cross section of the same showing the tire engaging rings in their retracted position.

Fig. 3 is a similar view showing the rings pinched against the tire.

Figure 1:
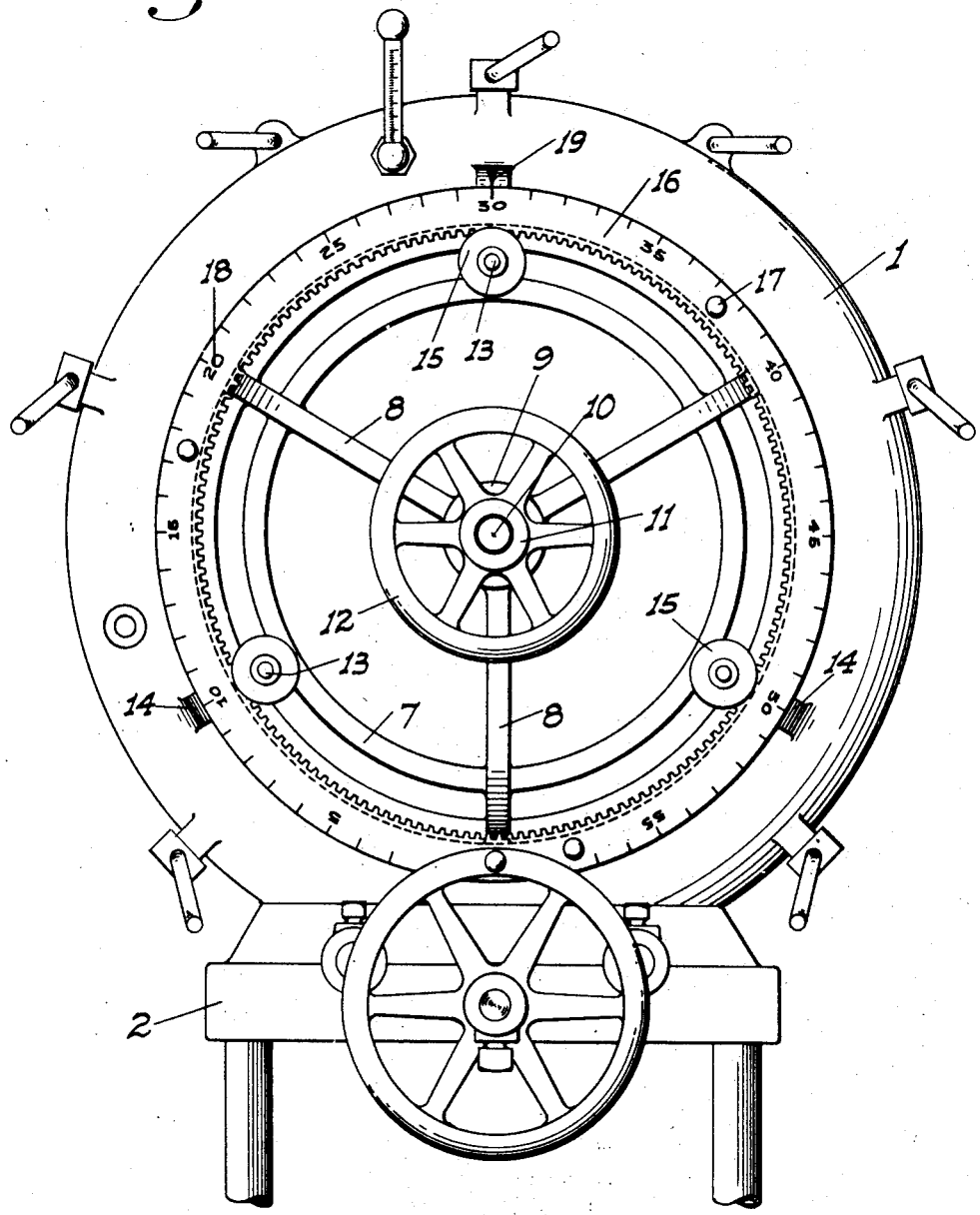
Fig. 1 is a front elevation of my improved mold structure.

Referring now more particularly to the characters of reference on the drawings, the numeral 1 denotes a pair of separable annular mold sections supported in a vertical position on a frame 2, movable to and from each other and clamped against movement when brought together by suitable means such as is fully shown and described in the above mentioned co-pending application, and forming no part of this invention.

Annular matrix sections 3 having the design of the tread portion 4 of a tire 5 formed therein are removably mounted in the mold sections, said matrix and mold sections extending inwardly to a point adjacent the central sectional plane of the tire, or to the base of the tread portion thereof. The tire when placed in the mold is mounted on an ordinary rim 6 and the sides of the tire then project inwardly of the mold. Slidably fitting the inner periphery of the mold sections and matrices are opposed rigid rings 7, adapted on their inner faces to engage the sides of the tire between the tread and the rim engaging portions thereof.

The rings are preferably brought together by the improved structure shown in the co-pending application for patent of E. A. Glynn, Serial No. 326,322, filed December 15, 1928. This consists essentially of rigid spiders 8 formed with the rings, through the hubs 9 of which spiders a shaft 10 passes. This shaft is detachably connected at one end to one spider, while at its other end is threaded and engaged by the hub 11 of a hand wheel 12.

My present invention concerns the means provided to limit the extent to which the rings can thus be moved toward each other, and since such means is duplicated for each ring but one will be described.

Projecting outwardly from each ring parallel to the shaft 10 is a plurality of threaded studs or pins 13, which are slidable through rigid lugs 14 secured to the mold and spaced sufficiently from the plane of the outside of the mold to enable the ring to be retracted from the tire a certain distance, since the lugs naturally project into the path of movement of the ring. Full shrouded pinions 15 are threaded on the studs outwardly of the lugs, all said pinions being engaged in common by and supporting an internal ring gear 16 which is held in constant mesh with the pinions by the shrouds thereof. The ring gear is provided with suitable handles 17 and is arbitrarily graduated about its outer face as shown at 18, said graduations being arranged to read against any fixed mark on the mold, such as is indicated at 19.

By reason of the above arrangement it will be seen that the pinions in effect are stops to engage the lugs when the rings have been moved toward each other a certain distance and thereby limiting such movement of the rings. It will also be seen that by turning the ring gear the pinions will be rotated, and being threaded on the studs will be moved lengthwise thereon and all to the same extent. Consequently the distance between the adjacent faces of the pinions and ring, and between which the lugs project will be correspondingly altered. The employment of the adjustable stop members and the operating means on both rings, insures that the rings will be symmetrically disposed relative to the central transverse plane of the mold when brought together to their limit of movement by the rotation of the hand wheel.

The use of a plurality of studs, lugs and pinions rather than a single one not only provides for the suitable support of the ring gear in concentric relation with the mold without additional bearings, but insures that the rings will be stopped at different points of their circumference simultaneously.

In connection with the use of the graduated ring gears a chart is prepared and provided for different sizes of tires, giving thereon the extent to which the ring gear must be turned relative to the mark 19 for such different tires, and thereby determining the setting of the pinions on the studs.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A tire retreading mold including an annular mold structure to receive the tire to be retreaded, a pair of rigid opposed annular rings to project inwardly of the mold to engage the opposite sides of a tire engaged with the mold, means applied to the rings for moving the same axially toward each other, and means for limiting the movement of the rings irrespective of the manipulation of the ring moving means.

2. A tire retreading mold including an annular mold structure to receive the tire to be retreaded, a pair of rigid opposed annular rings to project inwardly of the mold to engage the opposite sides of a tire engaged with the mold, means for moving the rings axially toward each other, and independent means for limiting such movement.

3. A tire retreading mold including an annular mold structure to receive the tire to be retreaded, a pair of rigid opposed annular rings to project inwardly of the mold to engage the opposite sides of a tire engaged with the mold, means for moving the rings axially toward each other, stop means for limiting such movement, and means for adjusting said stop means to enable the extent of movement of the rings to be altered.

4. A tire retreading mold including an annular mold structure to receive the tire to be retreaded, a pair of rigid opposed annular rings to project inwardly of the mold to engage the opposite sides of a tire engaged with the mold, means for moving the rings axially toward each other, a pin projecting outwardly from one ring parallel to the axis thereof, a lug fixed on the mold structure and through which the pin slidably projects and a stop mounted on the pin outwardly of the lug for engagement therewith when the ring has been moved axially of the mold and toward the tire therein a certain distance.

5. A structure as in claim 4, with means for adjusting the position of the stop along the pin.

6. A tire retreading mold including an annular mold structure to receive the tire to be retreaded, a pair of rigid opposed annular rings to project inwardly of the mold to engage the opposite sides of a tire engaged with the mold, means for moving the rings axially toward each other, a plurality of pins projecting outwardly from one ring in circumferentially spaced relation and parallel to the axis thereof, lugs fixed on the mold structure and through which the pins slidably project, and stops for engagement with the lugs fixed on the pins outwardly of said lugs.

7. A structure as in claim 6, with means for adjusting the setting of all the stops along their pins simultaneously.

8. A tire retreading mold including an annular mold structure to receive the tire to be retreaded, a pair of rigid opposed annular rings to project inwardly of the mold to engage the opposite sides of a tire engaged with the mold, means for moving the rings axially toward each other, a plurality of screw-pins projecting outwardly from one ring in circumferentially spaced relation and parallel to the axis thereof, lugs fixed on the mold structure and through which the pins slidably project, and stops for engagement with the lugs threaded on the pins outwardly of said lugs.

9. A structure as in claim 8, with means for rotating all said stops simultaneously to cause them to be simultaneously moved lengthwise along their pins.

10. A structure as in claim 8, in which said stops are in the form of pinions, and a turnable gear is mounted in connection with and engages all said pinions simultaneously.

11. A tire retreading mold including an annular mold structure to receive the tire to be retreaded, a pair of rigid opposed annular rings to project inwardly of the mold to engage the opposite sides of a tire engaged with the mold, means for moving the rings axially toward each other, a plurality of pins projecting outwardly from one ring in circumferentially spaced relation and parallel to the axis thereof, lugs fixed on the mold structure and through which the pins slidably project, shrouded pinions forming stops for engagement with the lugs threaded on the pins outwardly of said lugs, and a ring gear supported by and engaging all said pinions simultaneously and being located between the shrouds thereof whereby to cause said gear to remain alined and meshed with the pinions irrespective of the turning of the gear and the movement of the pinions along the pins.

In testimony whereof I affix my signature.

HERBERT J. WOOCK.